United States Patent
Briden et al.

(10) Patent No.: US 9,292,478 B2
(45) Date of Patent: *Mar. 22, 2016

(54) VISUAL EDITOR FOR EDITING COMPLEX EXPRESSIONS

(75) Inventors: Frederick Charles Ernest Briden, Ashburn, VA (US); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1073 days.

This patent is subject to a terminal disclaimer.

(21) Appl. No.: 12/340,954

(22) Filed: Dec. 22, 2008

(65) Prior Publication Data

US 2010/0162210 A1    Jun. 24, 2010

(51) Int. Cl.
G06F 9/44       (2006.01)
G06F 17/21      (2006.01)
G06F 17/24      (2006.01)
G06F 17/27      (2006.01)

(52) U.S. Cl.
CPC ............... *G06F 17/215* (2013.01); *G06F 8/33* (2013.01); *G06F 17/24* (2013.01); *G06F 17/271* (2013.01)

(58) Field of Classification Search
None
See application file for complete search history.

(56) References Cited

U.S. PATENT DOCUMENTS

| | | | |
|---|---|---|---|
| 5,187,788 A * | 2/1993 | Marmelstein | 717/109 |
| 5,267,346 A * | 11/1993 | Maruyama | G06Q 10/04 706/45 |
| 5,351,200 A * | 9/1994 | Impink, Jr. | G05B 23/0229 376/216 |
| 5,504,853 A * | 4/1996 | Schuur et al. | 715/853 |
| 5,546,507 A * | 8/1996 | Staub | 706/60 |
| 5,553,304 A * | 9/1996 | Lipner et al. | |
| 5,603,021 A * | 2/1997 | Spencer et al. | |
| 5,652,899 A * | 7/1997 | Mays et al. | 715/239 |
| 5,701,400 A * | 12/1997 | Amado | G06N 5/02 706/45 |
| 5,706,205 A * | 1/1998 | Masuda et al. | 716/103 |
| 5,790,863 A * | 8/1998 | Simonyi | 717/113 |
| 5,828,318 A * | 10/1998 | Cesar | G05B 19/0421 340/12.51 |
| 5,913,215 A * | 6/1999 | Rubinstein | G06F 17/275 707/708 |
| 5,929,423 A * | 7/1999 | Boersma | G06K 7/14 235/462.16 |
| 6,026,233 A * | 2/2000 | Shulman et al. | 717/113 |
| 6,083,278 A * | 7/2000 | Olson et al. | 717/113 |

(Continued)

OTHER PUBLICATIONS

"Shape", Wikipedia, Feb. 24, 2013, <http://en.wikipedia.org/wiki/Shape>, pp. 1-4.*

(Continued)

*Primary Examiner* — Thuy Dao
*Assistant Examiner* — Samuel Hayim
(74) *Attorney, Agent, or Firm* — Mollborn Patents, Inc.; Fredrik Mollborn

(57) ABSTRACT

Methods and apparatus, including computer program products, implementing and using techniques for providing a visual editor allowing graphical editing of expressions in an expression language. A graphical user interface is displayed. A first user input of an expression is received. The expression is defined in a logical or textual form, and each component of the expression is represented by a graphical element on the graphical user interface. A syntax of the first user input is verified and an alert is provided to the user in response to detecting a syntax error or an inconsistency of the first user input when verifying the syntax.

18 Claims, 22 Drawing Sheets

(56) References Cited

U.S. PATENT DOCUMENTS

| | | | | |
|---|---|---|---|---|
| 6,171,109 B1* | 1/2001 | Ohsuga | G06N 5/02 | |
| | | | 434/118 | |
| 6,233,545 B1* | 5/2001 | Datig | G06N 3/004 | |
| | | | 704/2 | |
| 6,243,614 B1* | 6/2001 | Anderson | G06F 17/50 | |
| | | | 700/103 | |
| 6,243,857 B1* | 6/2001 | Logan et al. | 717/111 | |
| 6,243,859 B1* | 6/2001 | Chen-Kuang | 717/111 | |
| 6,269,475 B1* | 7/2001 | Farrell et al. | 717/113 | |
| 6,353,452 B1* | 3/2002 | Hamada et al. | 715/825 | |
| 6,366,300 B1* | 4/2002 | Ohara et al. | 715/771 | |
| 6,408,430 B2* | 6/2002 | Gunter et al. | 717/109 | |
| 6,441,835 B1* | 8/2002 | Pazel | 715/769 | |
| 6,489,970 B1* | 12/2002 | Pazel | 715/763 | |
| 6,558,431 B1* | 5/2003 | Lynch et al. | 715/210 | |
| 6,683,624 B1* | 1/2004 | Pazel et al. | 715/763 | |
| 6,757,889 B1* | 6/2004 | Ito | 717/112 | |
| 6,836,878 B1* | 12/2004 | Cuomo et al. | 717/100 | |
| 6,889,113 B2* | 5/2005 | Tasker et al. | 700/180 | |
| 6,973,649 B1 | 12/2005 | Pazel | | |
| 7,024,631 B1 | 4/2006 | Hudson et al. | | |
| 7,178,112 B1* | 2/2007 | Ciolfi et al. | 703/2 | |
| 7,299,419 B2 | 11/2007 | Evans | | |
| 7,975,233 B2* | 7/2011 | Macklem et al. | 715/763 | |
| 2003/0035009 A1 | 2/2003 | Kodosky et al. | | |
| 2003/0061600 A1* | 3/2003 | Bates et al. | 717/133 | |
| 2004/0006765 A1* | 1/2004 | Goldman | 717/116 | |
| 2005/0060129 A1* | 3/2005 | Mosterman et al. | 703/2 | |
| 2005/0086638 A1* | 4/2005 | Farn | 717/113 | |
| 2005/0107998 A1* | 5/2005 | McLernon et al. | 703/22 | |
| 2005/0108682 A1* | 5/2005 | Piehler et al. | 717/110 | |
| 2005/0114318 A1* | 5/2005 | Dettinger et al. | 707/3 | |
| 2005/0216248 A1* | 9/2005 | Ciolfi et al. | 703/22 | |
| 2005/0278286 A1* | 12/2005 | Djugash et al. | 707/1 | |
| 2005/0289506 A1* | 12/2005 | Renner | 717/105 | |
| 2006/0064670 A1 | 3/2006 | Linebarger et al. | | |
| 2007/0006145 A1* | 1/2007 | Hill et al. | 717/114 | |
| 2007/0027845 A1* | 2/2007 | Dettinger et al. | 707/3 | |
| 2008/0022259 A1* | 1/2008 | MacKlem et al. | 717/113 | |
| 2008/0022264 A1* | 1/2008 | Macklem et al. | 717/136 | |
| 2008/0082961 A1* | 4/2008 | Adams et al. | 717/109 | |
| 2008/0263512 A1 | 10/2008 | Dellas et al. | | |
| 2008/0263513 A1 | 10/2008 | Neumann et al. | | |
| 2008/0263515 A1 | 10/2008 | Dellas et al. | | |
| 2008/0270983 A1* | 10/2008 | Ahadian et al. | 717/113 | |
| 2008/0295085 A1 | 11/2008 | Rachamadugu et al. | | |
| 2009/0172636 A1* | 7/2009 | Griffith et al. | 717/113 | |

OTHER PUBLICATIONS

Mel Tsai et al., "EE411 Laboratory Exercise #1 using Xilinx Foundation v2.1i", UCSC, Feb. 1, 2001, <http://classes.soe.ucsc.edu/cmpe100/Fall02/Labs/EE411%201.htm>, pp. 1-28.*

Wei Su et al., "MathEdit, A Browser-based Visual Mathematics Expression Editor", Chicago Kent University, 2006, <http://wme.cs.kent.edu/mathedit/mathedit_one.pdf>, pp. 1-10.*

Matti Karjalainen et al., "Block Diagram Compilation and Grapghical Editing of DSP Algorithms in the QuickSig System", IEEE, 1988, <http://ieeexplore.ieee.org/stamp/stamp.jsp?tp=&arnumber=15107>, pp. 1-4.*

Claudia-Lavinia Ignat et al., "Grouping in Collaborative Graphical Editors", ACM, 2004, <http://delivery.acm.org/10.1145/1040000/1031682/p447-ignat.pdf>, pp. 1-10.*

USPTO Office Action. U.S. Appl. No. 13/403,194. Notification date: Apr. 3, 2013.

USPTO Office Action. U.S. Appl. No. 13/403,194, dated Jan. 30, 2014.

USPTO Office Action. U.S. Appl. No. 13/403,194, dated Jul. 24, 2014.

USPTO Office Action. U.S. Appl. No. 13/403,194, dated May 15, 2015.

USPTO Office Action. U.S. Appl. No. 13/403,194, dated Aug. 28, 2015.

USPTO Office Action. U.S. Appl. No. 13/403,194, dated Jul. 22, 2013.

* cited by examiner

VISUAL EDITOR FOR EDITING COMPLEX EXPRESSIONS

BACKGROUND

This invention relates to expression languages used in database technologies.

Many software products require the user to define rules, queries or conditions using an expression language. A few examples include: reporting tools that may allow their users to define database queries specifying the contents of a report; ETL (Extract Transform Load) tools, such as the DataStage tool, provided by International Business Machines (IBM) Corporation of Armonk, N.Y., that allow users to enter expressions to filter or transform a data set; and data profiling tools, such as the AuditStage, also provided by IBM, that allow users to define business rules describing constraints that the data should verify in order to fulfill certain data quality requirements.

A typical problem is that the expression languages used in products of this type often have a rich and complex syntax. The reason for the rich and complex syntax is that the expression languages must be flexible enough to cover all features that a user may need. Examples of expression languages include SQL (Structured Query Language), MDX (Multi Dimensional Expression), and various types of proprietary languages.

Often, the users who must define the expressions are not always skilled in programming languages. Users of reporting or data profiling tools are typically business users and not programmers. Even for programmers, the task of defining expressions can be tedious and error prone, since the product cannot always rely on a standardized language and a proprietary syntax must be introduced, which the user must learn.

Finally, sometimes the definition of a rule or a query may be defined in different steps by different users. For example, a business user may first define a high-level definition of the expression in plain English, and then, in a second step, a programmer may implement the technical details of the expression.

In all of these cases it may be challenging to find a comfortable method allowing users to define expressions using the full possibilities of the expression language, without requesting the users to learn a complex syntax or acquire programming skills.

Different solutions have been developed over the last few years in attempts to solve the above problems and make the software easier to use for business users. One common solution is to use a free-form text field, with some content assistance. That is, the user must still have some basic knowledge of the syntax of the expression language, but while he types the expression, an editor makes suggestions about the content. Features like code completion, syntax coloring, pop-up hints, error highlighting, and so on, are common in these programming tools.

Code templates can be also used to generate a "skeleton" of the expression and provide a starting point for the user. While this method is of great use for a programmer and does not set any limits for the complexity of the expression, the method is not very suitable for a pure business user with little programming language experience. The content assistance only provides hints, but does not require that the user respect the language constraints or prevent the user from making errors. Furthermore, once an error is contained in an expression, it may be difficult for the user to find the error. The user also still has to face the syntax of the language.

Another common solution is to use a table or tree form editor instead of a free form text editor. With such an editor, the user is no longer free to type any kind of expression, like in the above free form editor. Instead, the editor constraints the edits. A table editor can make an assumption about the format of the expression and force the user to enter each part of the expression in a different cell of a table, by choosing a possible value from a list of possibilities. For example an expression like: "IF age<18 THEN status='child'" may be edited in a table containing 6 columns where the user enters successively "age", "<", "18", "status", "'child'". A tree editor may allow the expression to be edited by adding nodes to a tree. Both techniques prevent the user from syntax errors, but significantly reduce the usability or flexibility of the editor.

A table based editor makes the assumption that an expression always contains the same number of elements in the same order. It is not easy to define an editor that would allow entering of a simple expression, such as "IF age<18 THEN status='child'", but also a more complex expression, such as "IF ((col1+col2)/2)>50 and abs(col3)>10 then rtrim (col4)='abc'". The tree editor may allow editing rules with different degrees of complexity, but is not intuitive for the user, as the tokenization of an expression in a tree of elements and sub-elements is not a natural way for the user to enter or read an expression.

Another approach is to use a specialized graphical editor. For instance some SQL query builders are based on a graphical canvas, where the user can drag and drop tables, check/uncheck a list of columns and connect the objects graphically to define join. Generally, these editors are specialized for a specific type of expressions (for example, such an editor may allow editing a SQL query, but not an update statement). Furthermore, graphical editors often have to rely on free form editors or table editors to define elements of their query (for example, a join condition). Another drawback is that their usage must be learned and is completely different from a text based solution. Skilled users who are familiar with the syntax of the expression languages often have difficulties using such tools.

SUMMARY

In general, in one aspect, the invention provides methods and apparatus, including computer program products, implementing and using techniques for providing a visual editor allowing graphical editing of expressions in an expression language. A graphical user interface is displayed. A first user input of an expression is received. The expression is defined in a logical or textual form, and each component of the expression is represented by a graphical element on the graphical user interface. A syntax of the first user input is verified and an alert is provided to the user in response to detecting a syntax error or an inconsistency of the first user input when verifying the syntax.

Advantageous implementations can include one or more of the following features. The expression language can be a structured query language, a multi dimensional expression language, or a scripting language. A second user input can be received that converts one or more expressions defined in a textual form into to expressions defined in a logical form, and verifying a syntax can include verifying the syntax after receiving the second user input. The expression can be displayed on the graphical user interface as a root element and one or more sub-elements, wherein each root element or sub-element includes rules defining what further sub-elements can be added to the root element or sub-elements, respectively, and where each sub-element can be defined in a logical or textual form. The layout of the displayed expression can be changed on the graphical user interface in response to detecting an increased or decreased complexity of the expression.

A focus indicator can be displayed, which indicates to the user what graphical element is currently being edited by the user. One or more of the graphical elements can be displayed in an expanded state or a collapsed state, where the expanded state provides further details about the component represented by the graphical element compared to the collapsed state. In response to selecting a graphical element to be edited, a list of available graphical elements that can be added as sub-elements to the selected graphical element can be displayed. A validation icon can be displayed on the graphical user interface. The validation icon initiates a validation of the expression in response to being selected. A palette can be displayed on the graphical user interface. The palette contains representations of available graphical elements that can be added as sub-elements to the selected graphical element.

The invention can be implemented to include one or more of the following advantages. The advantages of a tree editor, such as hierarchical definition of the expression in a constraint way which prevents the user from making syntax errors, are combined with the advantages of a free form editor, such as natural representation of the expression in a linear way, which is easiest to understand for a typical user. As a result, the graphical editor in accordance with various embodiments of the invention allows editing of expressions independently from the complexity of the expression. The graphical editor works in a constrained way and prevents users from entering syntax errors. The graphical editor is intuitive to use and understand, and is therefore suitable both for a business user entering a high level definition, and for a skilled programmer familiar with the syntax, and allows a top-down editing approach.

Furthermore, the various embodiments of the graphical editor allow different levels of definition of the rule. For example, in a first pass, a user can provide a high-level definition of the overall expression only, and leave the implementation details for another user, or for a later time. In a second pass, another user may describe the expression further by editing the overall implementation of the expression, but the user can still also describe some sub-elements of the expression at a high level only and leave the exact implementation details (for example an exact binding) for later. It can be up to the user to decide to what extent the rules should be specified. When creating blocks, the user does not have to enter parentheses, which is typically a process that is prone to errors. Since the graphical editor automatically adds sub-elements when needed, less input work from the users is required.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
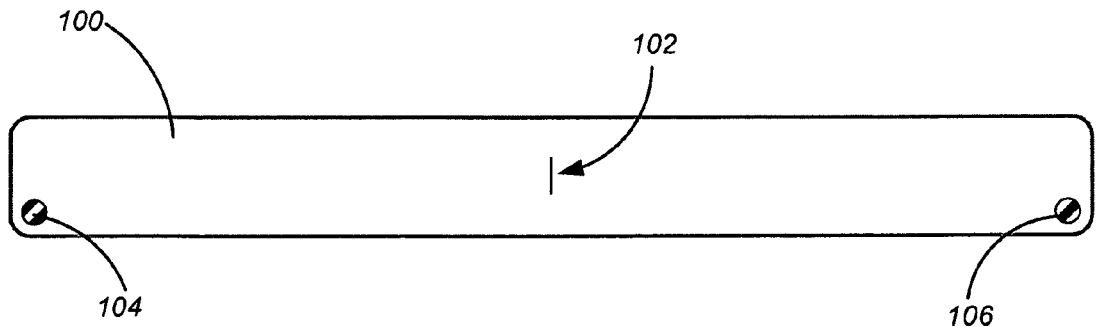
FIGS. 1-32 show exemplary screenshots of a user interface for the graphical editor, in accordance with various embodiments of the invention.

The various embodiments of the invention described herein pertain to a graphical editor for editing expression languages. In particular, the various embodiments of the invention relate to a graphical editor, which displays an edited expression as a recursive list of graphical elements, as will be described in further detail below. Each element of a rule is represented by a geometric shape. This allows the user to enter a high level definition of the element, similar to a conventional editor, and to specify implementation details for the element by adding other graphical elements that are specified the same way. Thus each graphical element can recursively contain other figures specifying sub-element of a current element of an expression.

When defining a new expression, the user typically starts with a root element that represents the whole expression. The user can provide a high-level definition of the expression in plain text in this element. When the implementation details of the expression are defined, the user can add sub-elements which are represented as other graphical elements contained in the root figure. Each sub-element behaves like the root, that is, the user can enter high-level definitions and specify them further by adding further sub-elements. The list and order of the sub-elements, which can be added to an element, is controlled by the element itself. As a result, the user can only add elements that are allowed in the current context. In various embodiments of the invention, the layout of the graphical elements is updated automatically when the complexity of an expression increases, in order to offer the best view of the whole expression as a whole.

As was discussed above, the various embodiments of the graphical editor allow different levels of definition of the rule. For example, in a first pass, a user can provide a high-level definition of the overall expression only, and leave the implementation details for another user, or for a later time. In a second pass, the other user may describe the expression further by editing the overall implementation of the expression, but the other user can also describe some sub-elements of the expression at a high level only and leave the exact implementation details (for example an exact binding) for later. It can be up to the user to decide to what extent the rules should be specified.

In contrast to existing expression language editors, the various embodiments of this graphical editor allow editing of expressions irrespective of the complexity of the expression. The graphical editor works in a constrained way and prevents users from entering syntax errors. The graphical editor is intuitive to use and can be easily understood both by business users entering high level definitions, and for skilled programmers familiar with the syntax. Furthermore, the graphical editor allows a top down editing approach.

Various embodiments of the invention will now be described by way of example, and with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
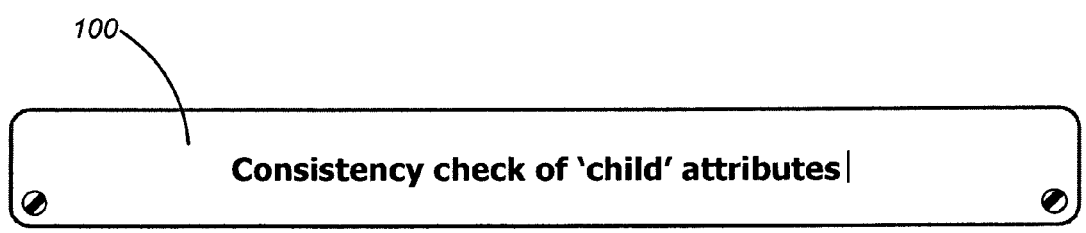

FIGS. 1-32 show exemplary screenshots of a user interface for the graphical editor, in accordance with various embodiments of the invention. The editing of a rule logic statement in an expression language, in accordance with various embodiments of the invention, will now be described with reference to these figures. FIG. 1 shows a user-defined rule logic statement, illustrated as a rounded block (100). Typically, the rounded block (100) has a specific color indicating the relative nesting-level of the rule logic block (100). Inside the block (100) a text input caret (102) is displayed, where the user can enter the high level definition of the rule. The rule logic block (100) that currently has input focus is surrounded by a focus indicator, such as an outline for the rounded box in a different color. The rule logic block (100) also has two visual indicators (104, 106), at the lower left and lower right sides, respectively, to indicate that the rule is not useable as is. That is, the user must still provide the actual rule logic. In the drawings, the unusable (or warning) indicators (104, 106) are illustrated as circles containing diagonal stripes. The user then types in a high level definition for the rule logic block (100), as shown in FIG. 2.

Figure 3:
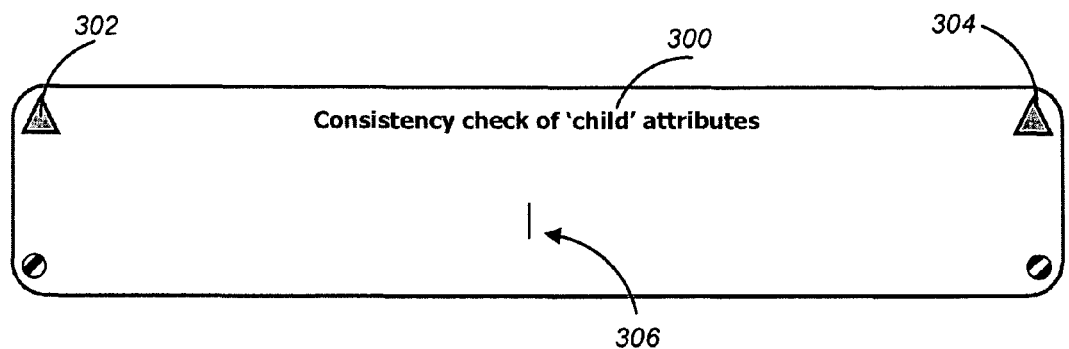
Figure 8:
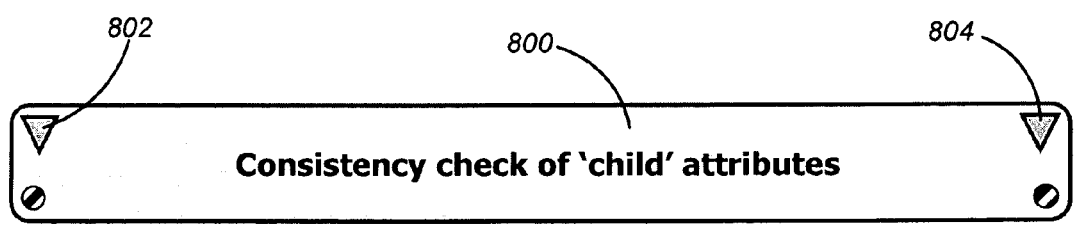

The user then presses 'enter' indicating that he has finished with the high level definition and wants to move on to the details. This is further illustrated in FIG. 3. As can be seen in FIG. 3, the high level definition is now shown in a title area (300) to give the user a context as to what the user is editing. There are also controls (302, 304) in the top left and right sides of the rule logic box, indicated by triangles in FIG. 3. These controls (302, 304) allow the user to switch between a high-level view and a detailed view, thus, in effect 'expanding' or 'collapsing' how much the user would like to see about the rule. When the rule is in an 'expanded' state, as shown in FIG. 3, and the user clicks on one of the controls (302, 304), the rule logic block (100) changes to a 'collapsed' state (800), as shown in FIG. 8. Similar to the high-level block in FIG. 1, there is an input caret (306) in the middle of the rule logic block (100) where the user can start defining rule details.

Figure 4:
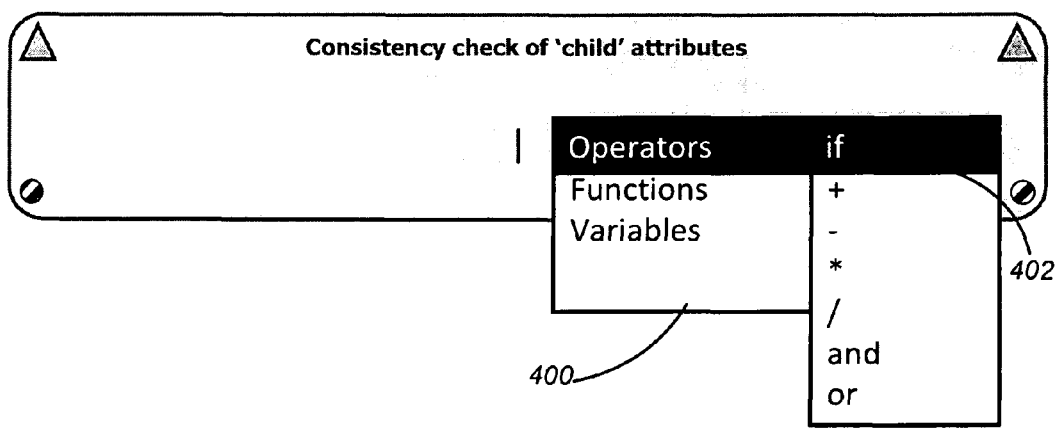
Figure 5:
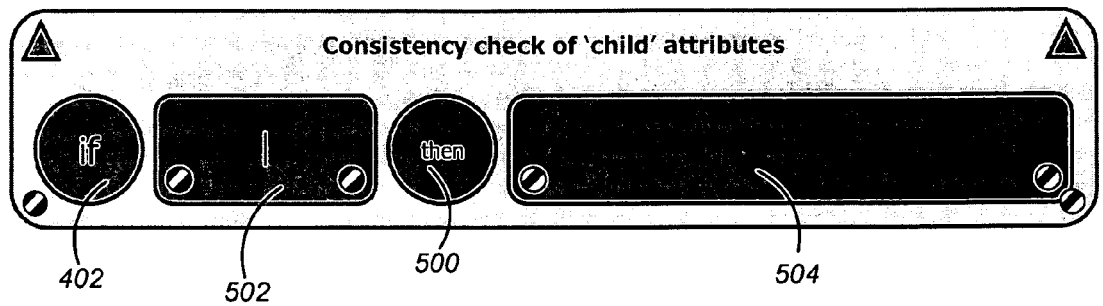

The input caret (306) in the detail areas allows the user to select blocks of logic to add to the area. When the user presses enter, a list (400) of possible blocks that can be added at that particular spot is displayed, as illustrated in FIG. 4. After the user selects one of the elements (for example 'if' (402), as illustrated in FIGS. 4 and 5, the boxes surrounding the selected element (402), will be filled in. That is, if the user selected 'if', the 'if' will be filled in, as well as a 'then' block (500) and the two additional rule logic blocks (502, 504) to go with the if-then statement. Additionally, the text input caret will be moved to the first high-level definition rule logic block (502) the user would need to fill in.

Figure 6:
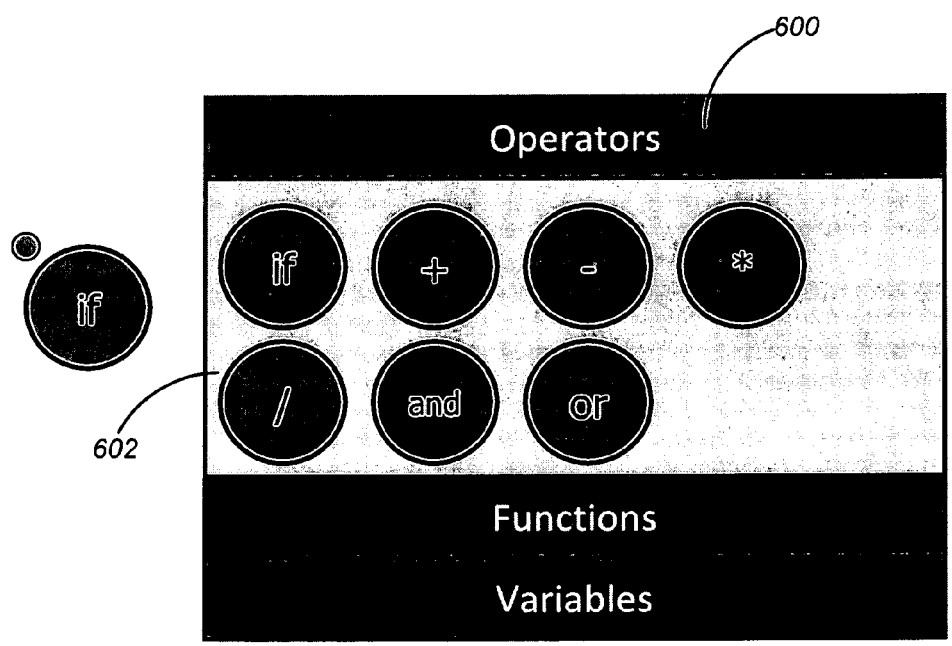
Figure 7:
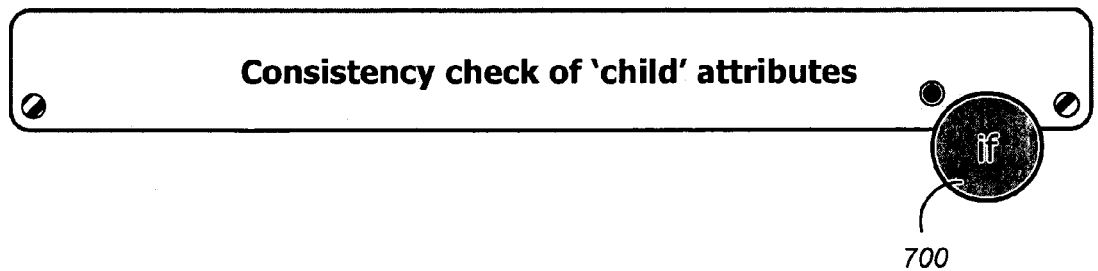

In addition to typing expressions, the user can be presented with a 'palette' (600) of logic blocks that the user can add to the rule he is creating, as shown in FIG. 6. From that palette (600), the user can select rule blocks (602) and drag them onto the respective rule, as shown in FIGS. 6 and 7. For example, dragging an 'if' block (700) to the rule would result in the view shown in FIG. 5, just as if the user had typed in 'if'. As can be seen in the figures, circles are used for operations, rounded boxes are used for rule blocks, and cutout squares are used for literals (one style for strings, a different style for integers). However, as the skilled person realizes, this is merely one example, and many alternative representations are possible. Collapsed rule blocks (800), as shown in FIG. 8, where only the high level definition is shown, can be expanded by selecting the expansion controls (802, 804) in the top right and left sides of the rule block (indicated by triangles in FIG. 8).

Figure 9:
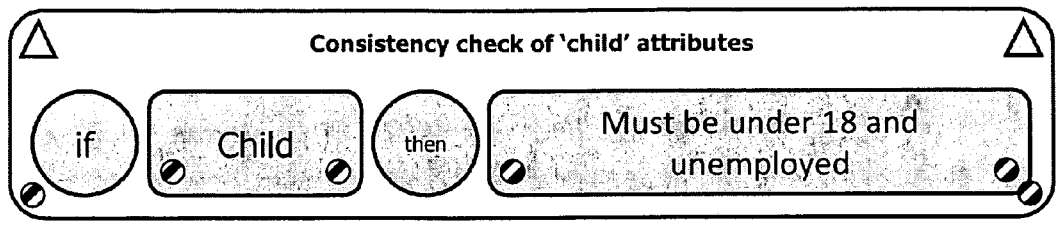
Figure 10:
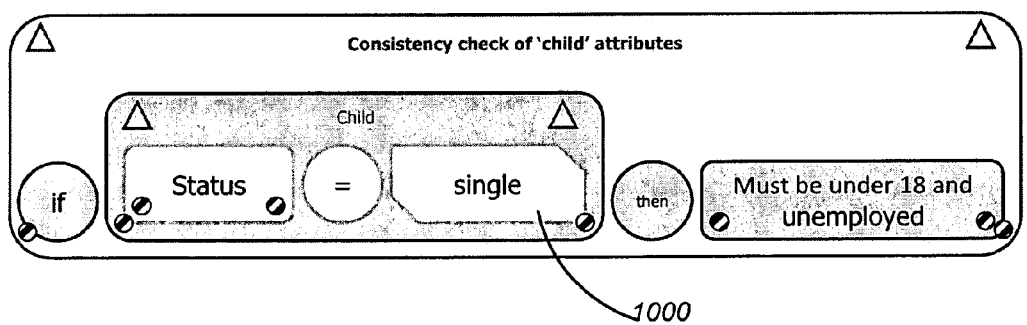
Figure 11:
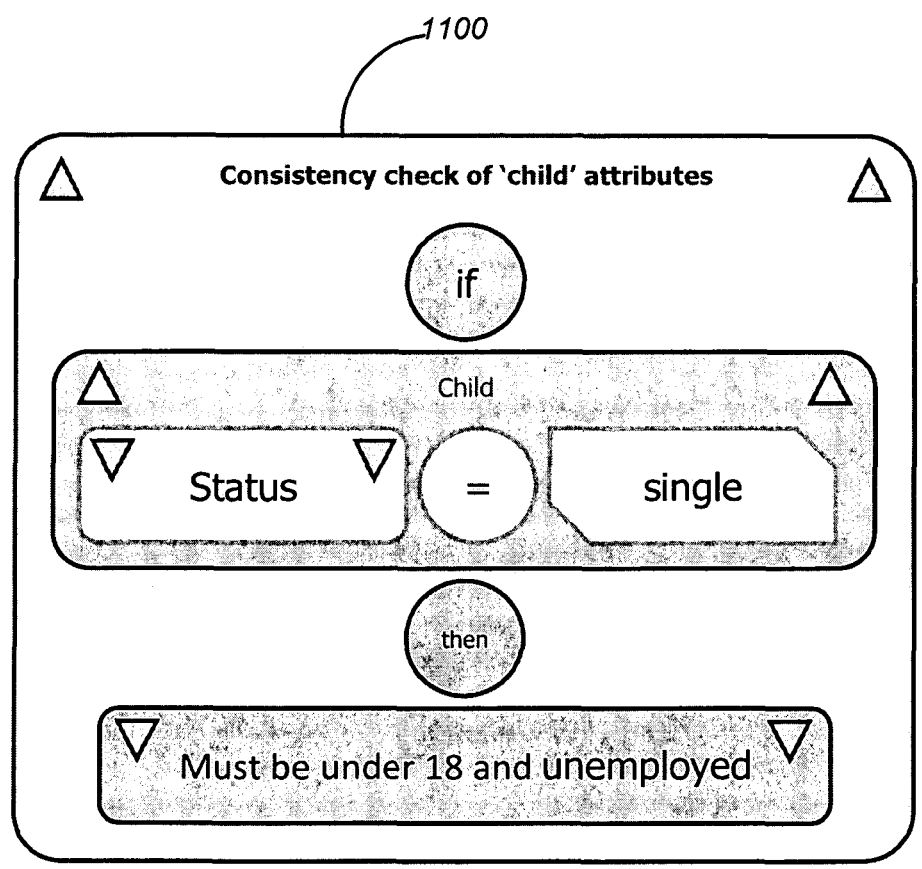
Figure 12:
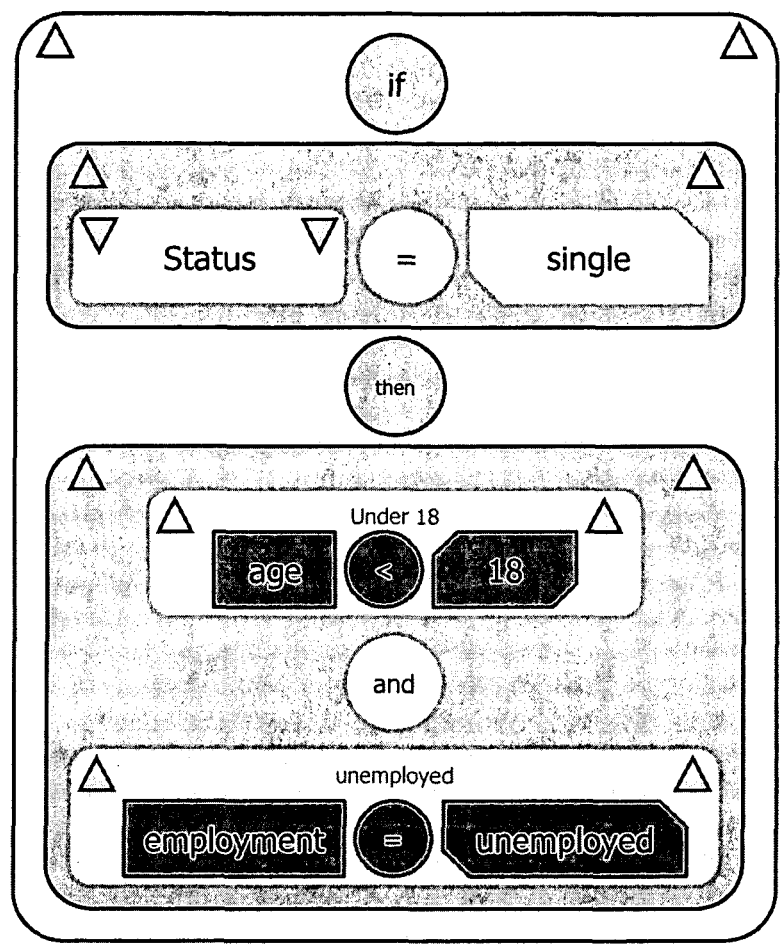

Next, the user continues to fill in high-level definitions and details of the implementation, as shown in FIGS. 9 and 10. FIG. 10 shows a rule block (1000) that has a different shape, in order to indicate that the rule block is a string literal. At some point the rule will grow sufficiently complex that it is no longer feasible to display the rule horizontally. At that point, the display is automatically switched to a vertical presentation (1100) of the rule, as shown in FIG. 11. It should be noted that in some embodiments parent rules are shown vertically and child rules are shown horizontally, as shown in FIG. 12, depending on what is most suitable from a space point of view.

Figure 13:
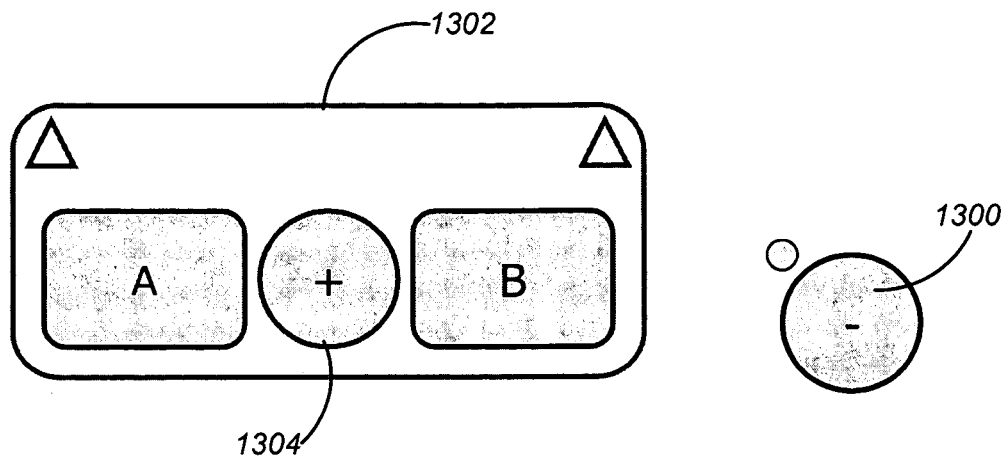
Figure 14:
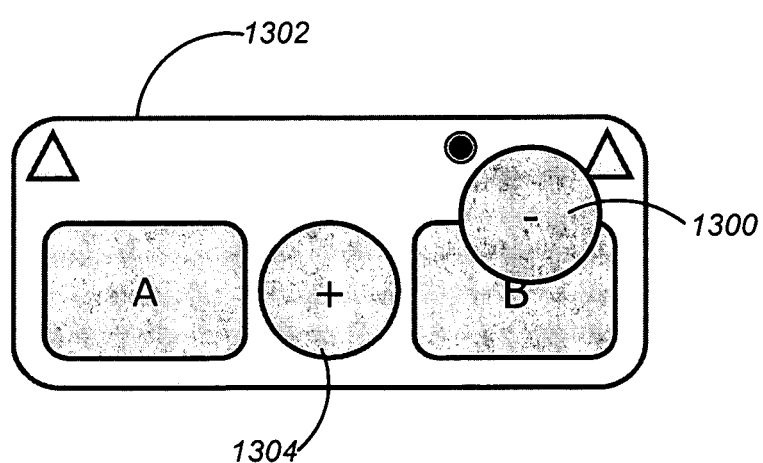
Figure 15:
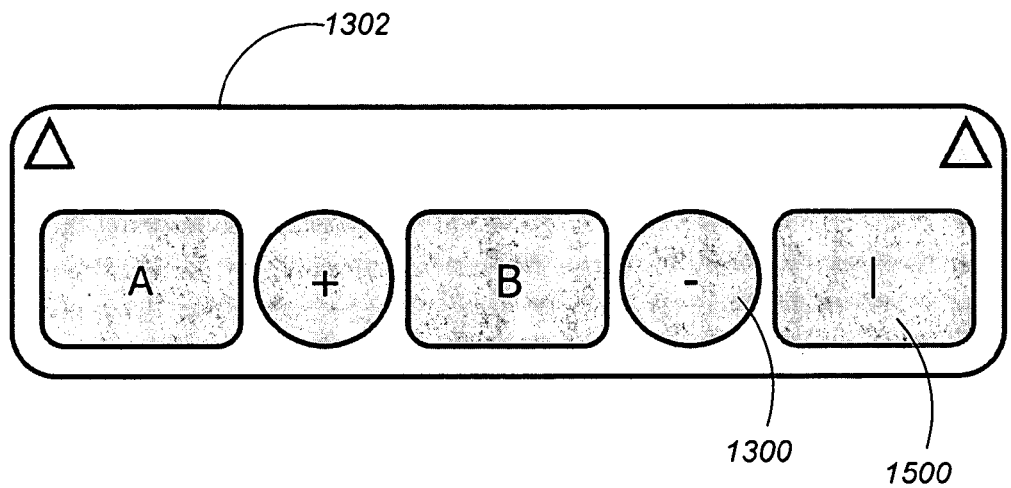

Adding an operator with the same precedence level appends the operator (1300) to the end of a selected rule logic block (1302). FIGS. 13 and 14 show a user dragging a '−' operator (1300) to a rule block (1302) (which already has a '+' operator (1304) at the same precedence level). FIG. 15 shows the operator (1300) being added to the end of the selected rule logic block (1302), along with a block (1500) indicating that there is a need for further user input.

Figure 16:
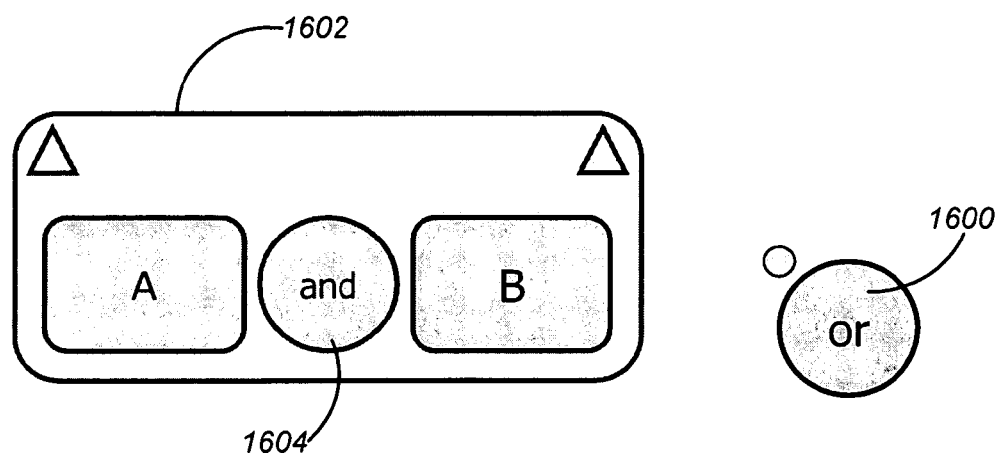
Figure 17:
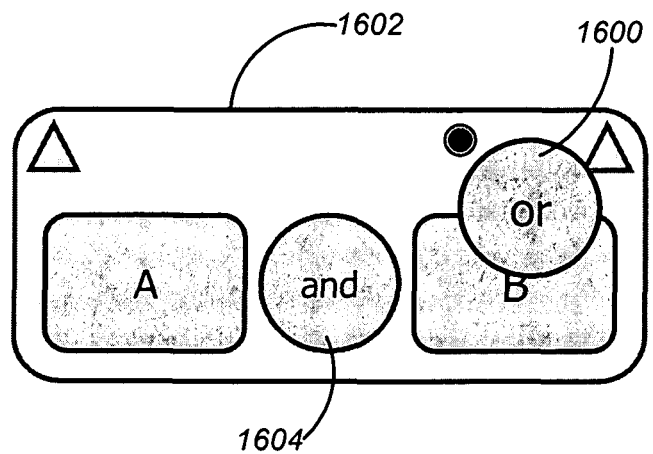
Figure 18:
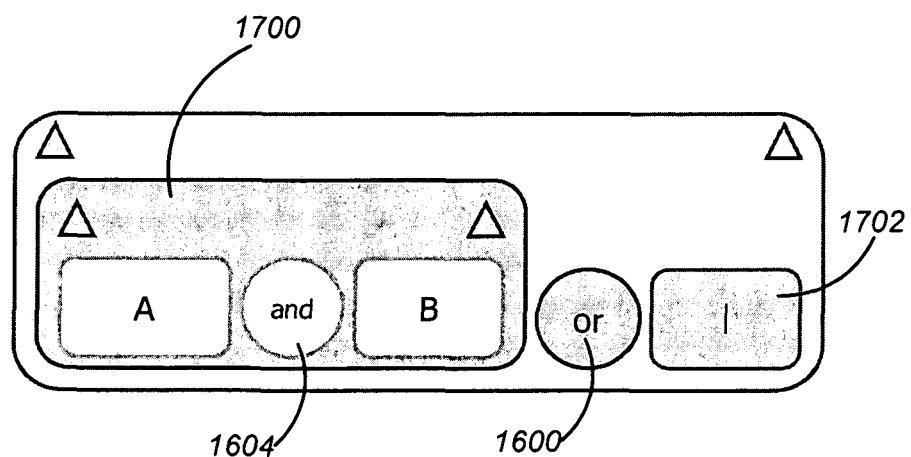

Adding an operator with a different precedence level creates a new nested rule block. FIGS. 16 and 17 show the user dragging an 'or' operator (1600) to a rule block (1602) (which already has an 'and' operator (1064) at a different precedence level). Here, since the user desires to 'or' some previously defined logic, a new block (1700) is created for the 'and' operator (1604), which is related to the new block (1702) through the 'or' operator (1600), as can be seen in FIG. 18.

Figure 19:
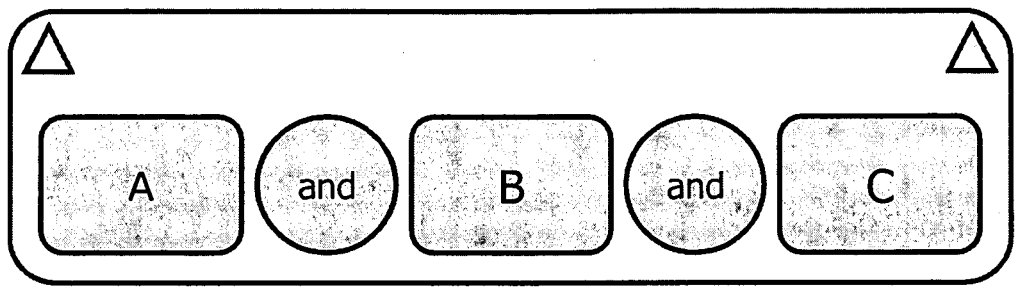
Figure 20:
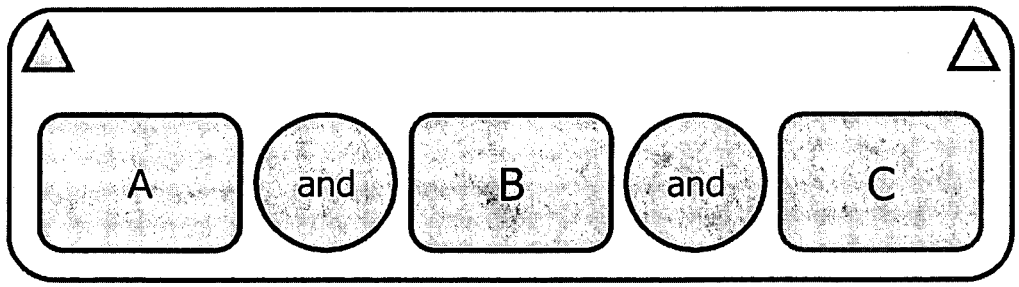
Figure 21:
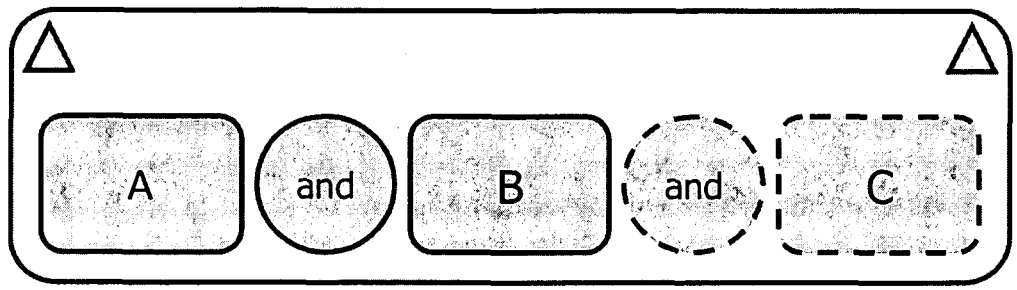
Figure 22:
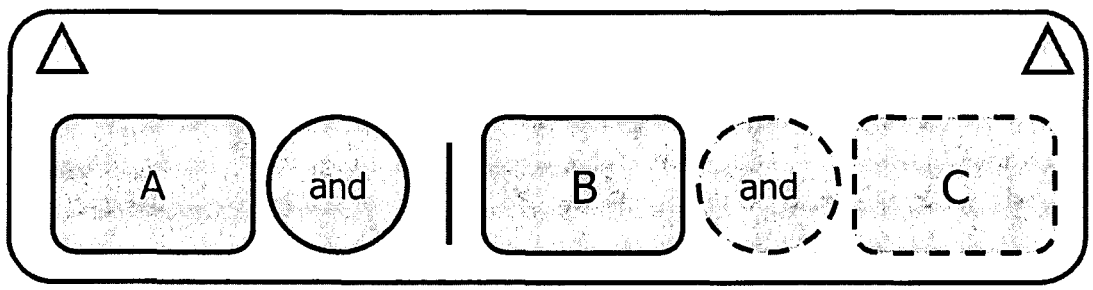
Figure 23:
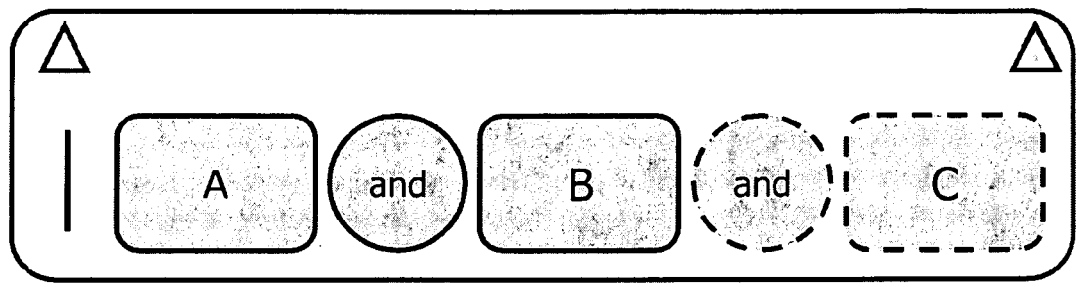
Figure 24:
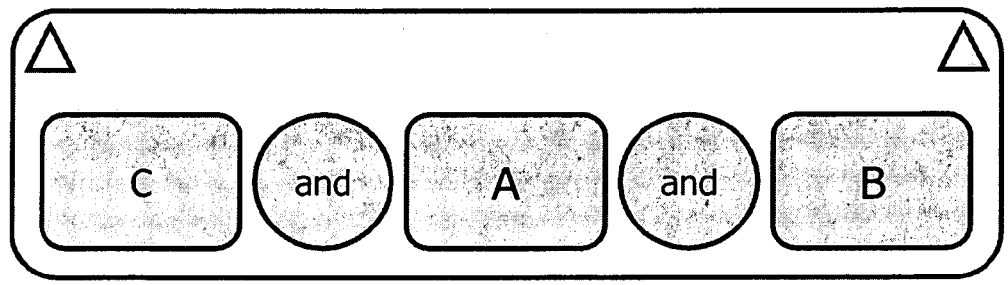
Figure 25:
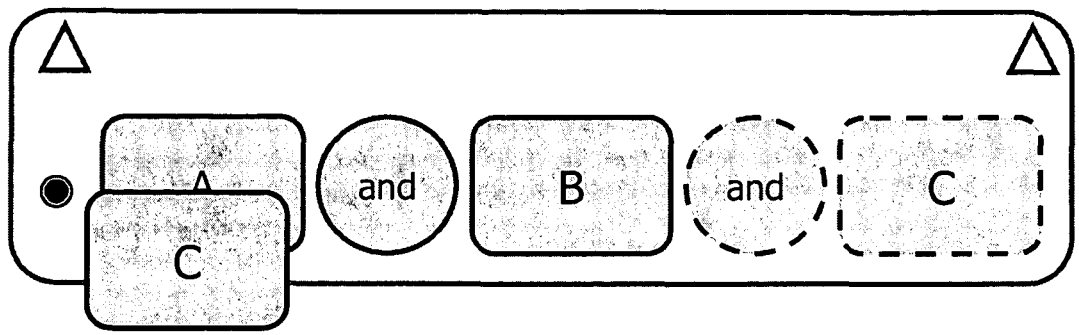

A rule block can be reorganized at the same depth by selecting the block, as shown in FIGS. 19 and 20, cutting the rule block using "cut-and-paste" operations, as shown in FIG. 21 (which shows an associated operation being cut as well), where the cut blocks are marked with a dashed line. The input caret is then moved to indicate where the cut section should be pasted, as shown in FIGS. 22 and 23, and then finally pasting the cut out section, as shown in FIG. 24. The same operation could be accomplished with a "drag-and-drop" operation, that is, the block is selected, the block is cut and then dragged to where the user wants to place the block, as shown in FIG. 25.

Figure 26:
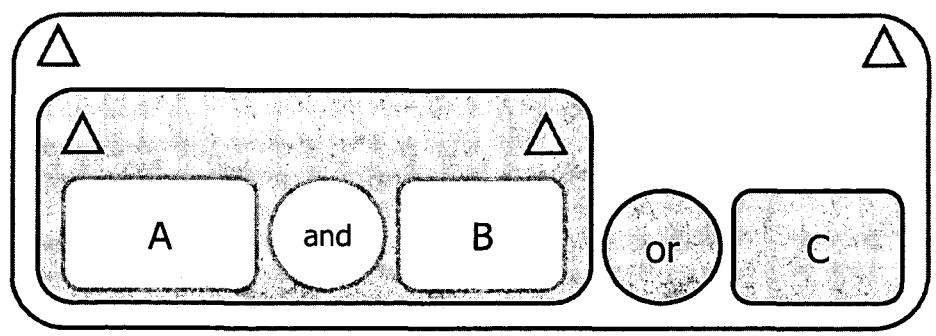
Figure 27:
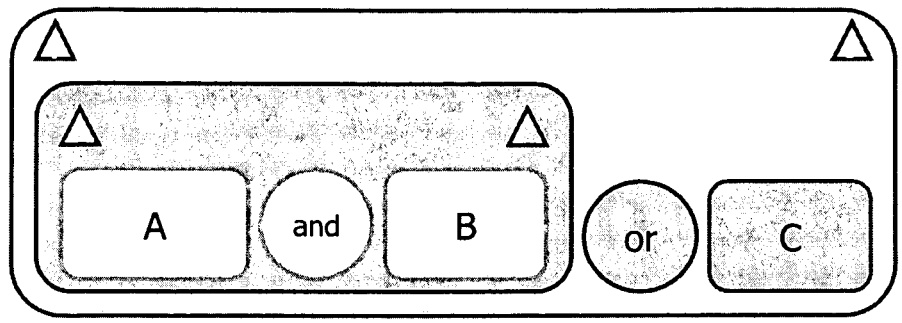
Figure 28:
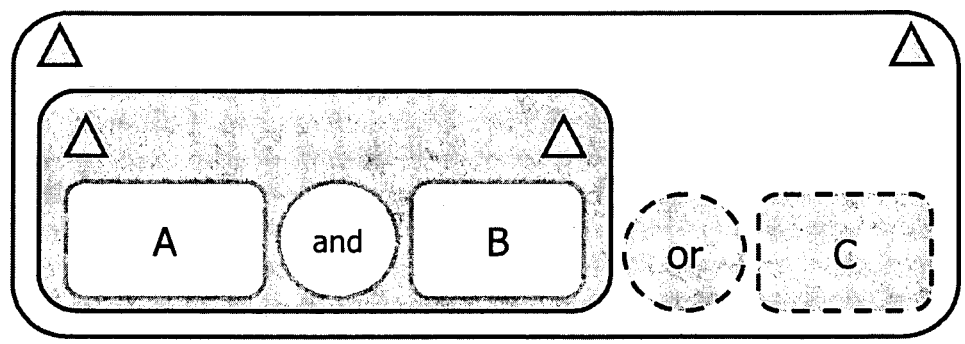
Figure 29:
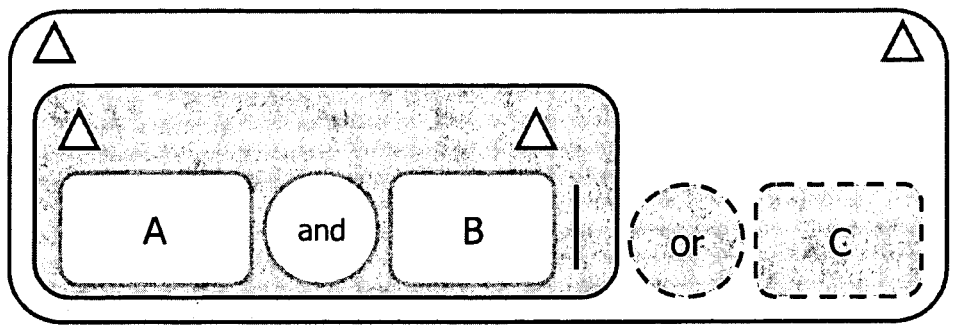
Figure 30:
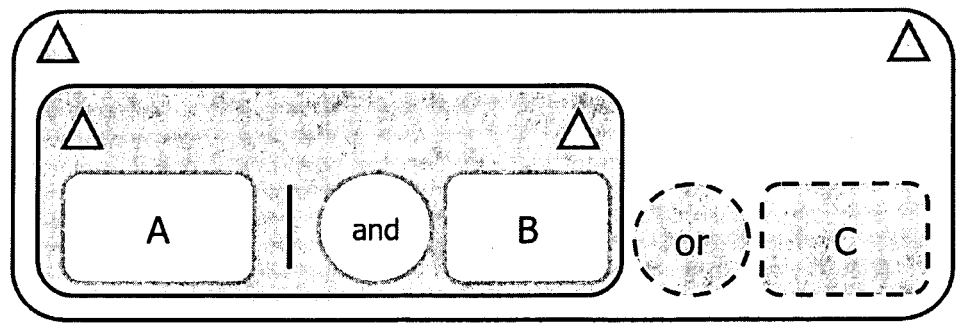
Figure 31:
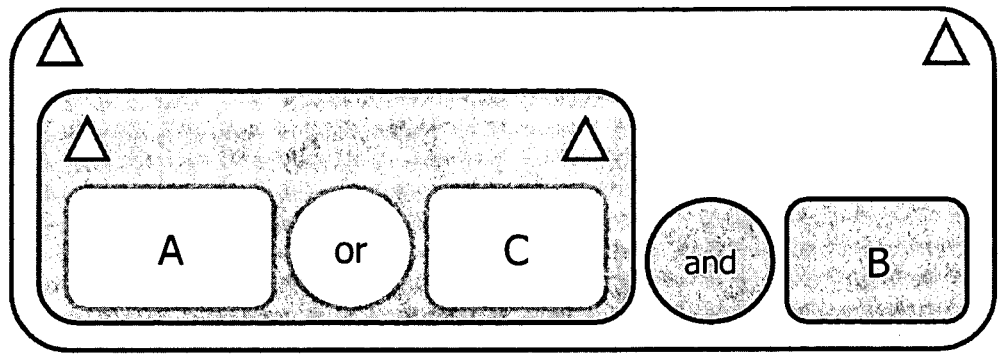

A rule block can be reorganized at different depths by selecting the block, as shown in FIGS. 26 and 27, cutting the block using a cut-and-paste operation, as shown in FIG. 28 (which shows an associated operation being cut as well), moving the input caret to indicate where the cut block should be pasted, as shown in FIGS. 29 and 30, and then finally pasting the cut block, as shown in FIG. 31.

Figure 32:
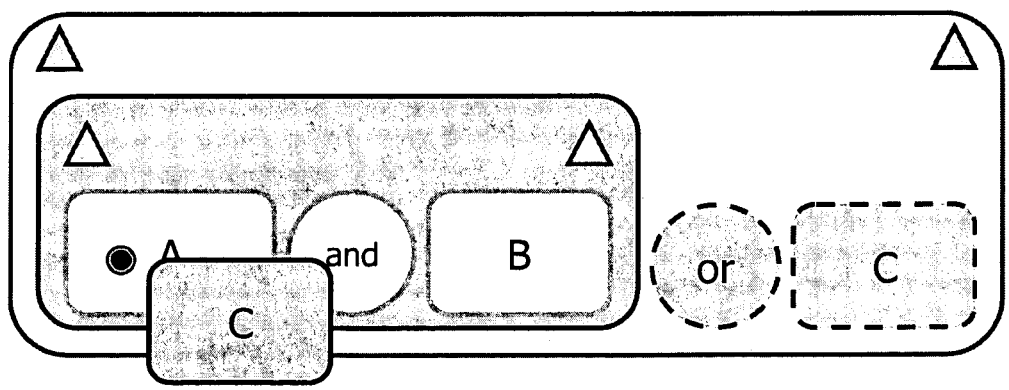

It should be noted that since the definition of the rule is being fundamentally changed here, the nesting will be automatically changed, where appropriate. In this example, the user wants to 'or' to two blocks, which will then push an 'and' block (which is at a different precedence level) to a different nesting depth. Just as was discussed above, the same operation can be accomplished with a drag-and-drop operation, that is, the block is selected, cut, and then dragged to where the user would like to place the block, as shown in FIG. 32.

Figure 33:
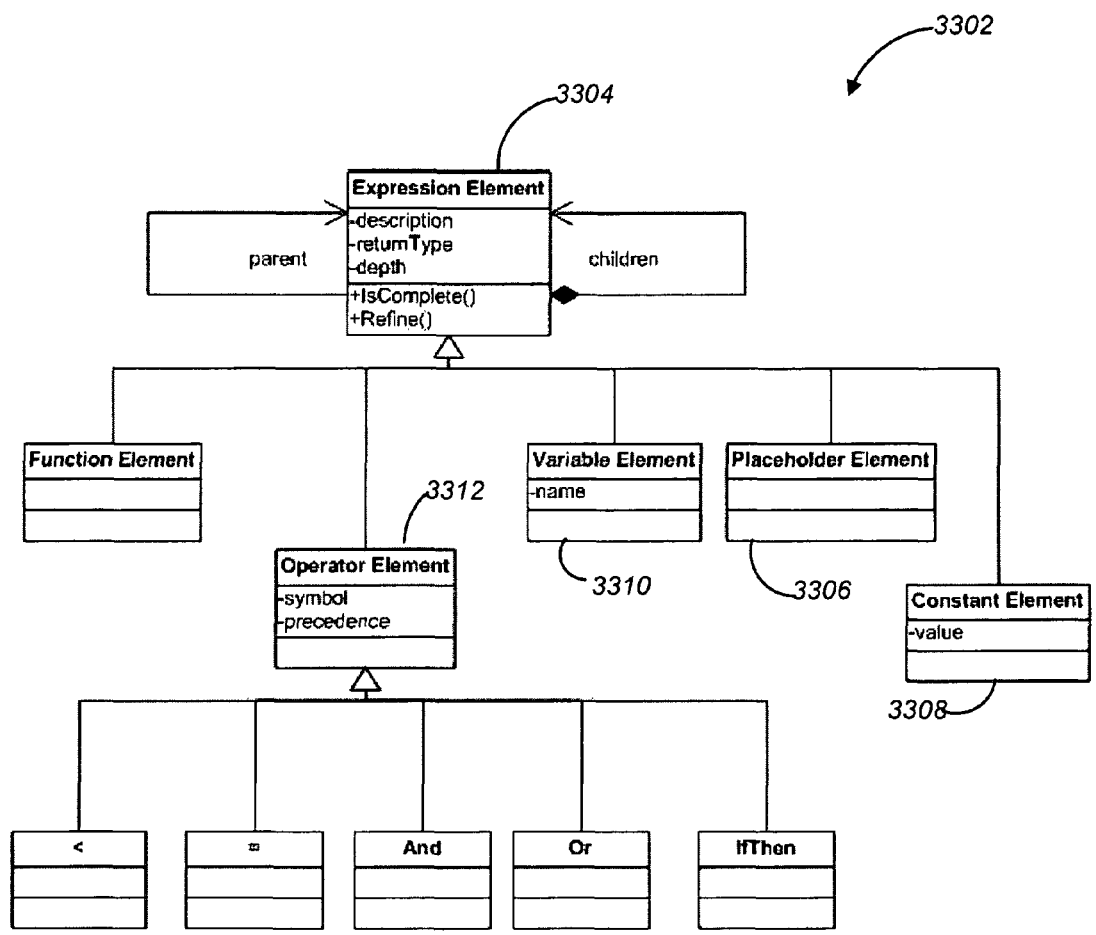
FIG. 33 shows a hierarchical tree structure for an expression element, in accordance with one embodiment of the invention.

FIGS. 33-37 show some further implementation details in accordance with various embodiments of the invention, which will now be discussed. As can be seen in FIG. 33, all elements (3302) are derived from an expression element (3304). In most implementations, the expression element (3304) roughly corresponds to one of the boxes in the pictorial examples discussed above. As was seen above, every expression element (3304) can have a higher-level description, or comment, to illustrate the purpose of the expression. Additionally, each expression typically has:

A "return type," such as a Boolean, string, number, and so on, which is used for completeness and validation.

A "depth," which indicates how far down the hierarchical tree the expression is located.

One or more "children," which is a collection of the children of the expression. The subclasses of the expression element (3004) determine how many (if any) children the element has. The child count is fixed by the subclass, and children can never be added or moved, but can be refined.

A "Parent," which is the parent element in the expression tree.

An "IsComplete( )" function, which determines whether the expression element (3004) is complete or not, based on whether there are any placeholder children, if the children return types are compatible, and so on. It is up to the subclass to do its own computations as to whether the children's return types are incompatible.

A "Refine( )" function, which makes it possible to swap a current expression element (3004) with a new expression. As will be discussed in further detail below, an expression typically starts out with a sole Placeholder Expression. The user then chooses an actual expression to use, such as an "if-then" expression, an "and" expression, an "or" expression, and so on, which changes the placeholder element into an actual expression.

FIG. 33 shows a Placeholder element (3306) acts as an expression in situations where the user does not quite know yet what the exact actual expression should be. Thus, the Placeholder element (3306) can have a description and then get refined into a different expression, such as an "and," an "or," a variable or a constant, as the user determines how to best realize the description, as discussed above. Children of expression elements (3304) are never added or removed—they are only ever refined to—from a placeholder. For example, for the expression 'this'='that', object wise there would be an '=' operator with two children variables, 'this' and 'that'. Now assume that the user wants to get rid of 'that' because 'that' does not make sense for the expression. Since there must something on the right hand side of the '=' operator, what needs to be done is get rid of 'that' and replace 'that' with a placeholder until the user determines what 'that' should be. Thus, what really happens when removing 'that' is a refinement of 'that' to the placeholder, thus ending up with an expression 'this=[placeholder]'. The placeholder remains in the expression until the user has determined to what 'this' should be equal.

FIG. 33 also shows a Constant Element (3308), a Variable Element (3310) and an Operator Element (3312). The Constant Element (3308) has no children and acts as a constant value, such as 3.14, 'this', 'that', Jan. 1, 2001, and so on. The Variable Element (3310) has no children and denotes a variable with a name, such as 'this', 'A', 'x', and so on. The Operator Element (3312) denotes operators and is subclassed for specific operators. Each subclass controls how many children (if any) the operator element (3312) needs. Operators have a common symbol (which would typically show up in a textual representation of the expression), as well as a precedence, which is used for the visual grouping of expressions, as shown above.

Figure 34:
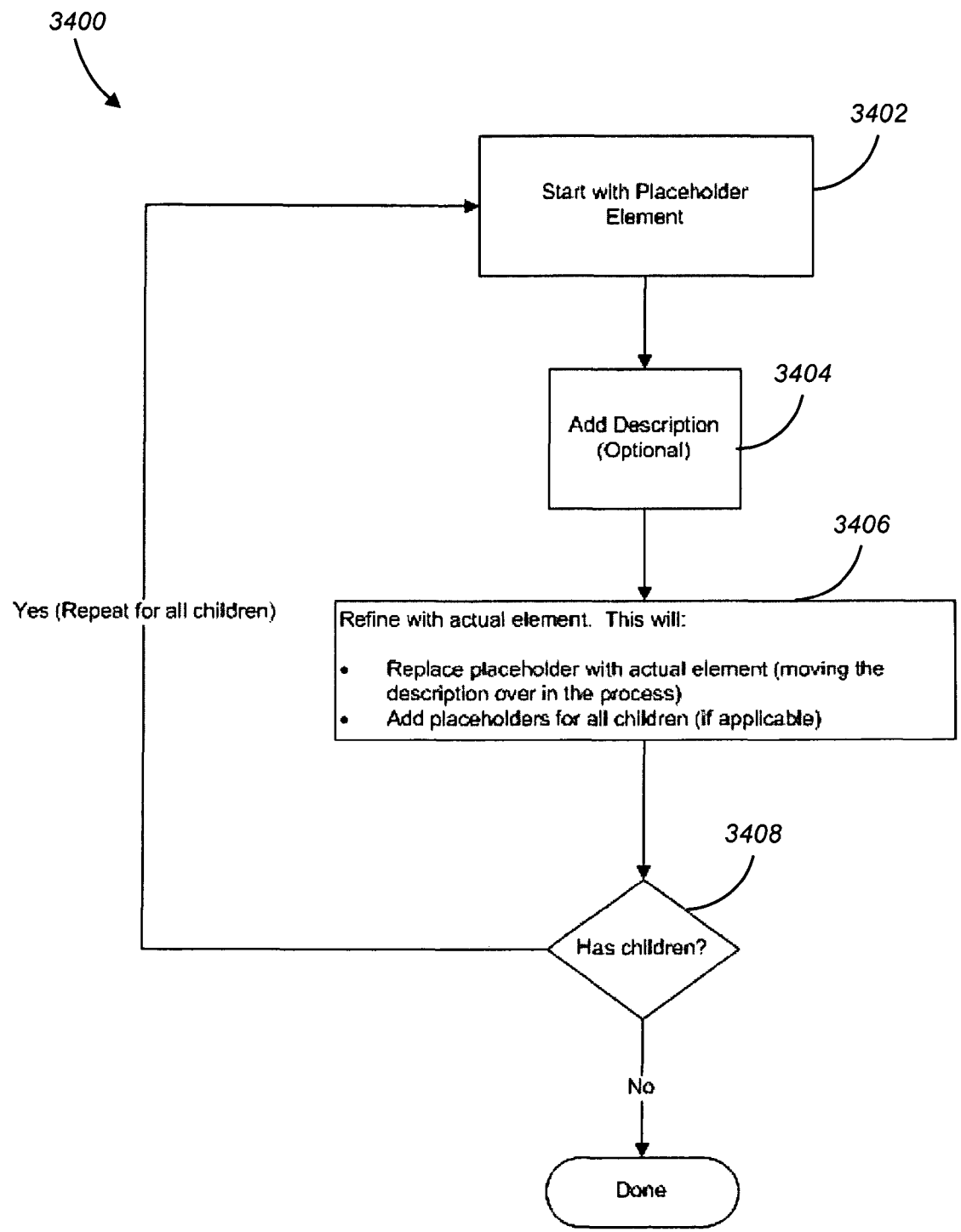
FIG. 34 shows a process for refining children of expressions in accordance with one embodiment of the invention.

As mentioned, children of expressions are never added or removed, they are only ever refined and in doing so additional sub-expressions get added/removed. FIG. 34 shows a process (3400) for refining children of expressions in accordance with one embodiment of the invention. As can be seen in FIG. 34, the process (3400) starts with a placeholder element (step 3402). Next, a description of the element is added (step 3404). It should be noted, however, that this step is optional. After the description is added, the placeholder is refined (step 3406) to an expression that realizes the description entered in step 3404. Next, the process checks whether the expression has any children (step 3408). If there are children, then the process returns to step 3402, where a placeholder for each child is added and the process continues as described above. If there are no children to the expression, the process (3400) ends.

Figure 35:
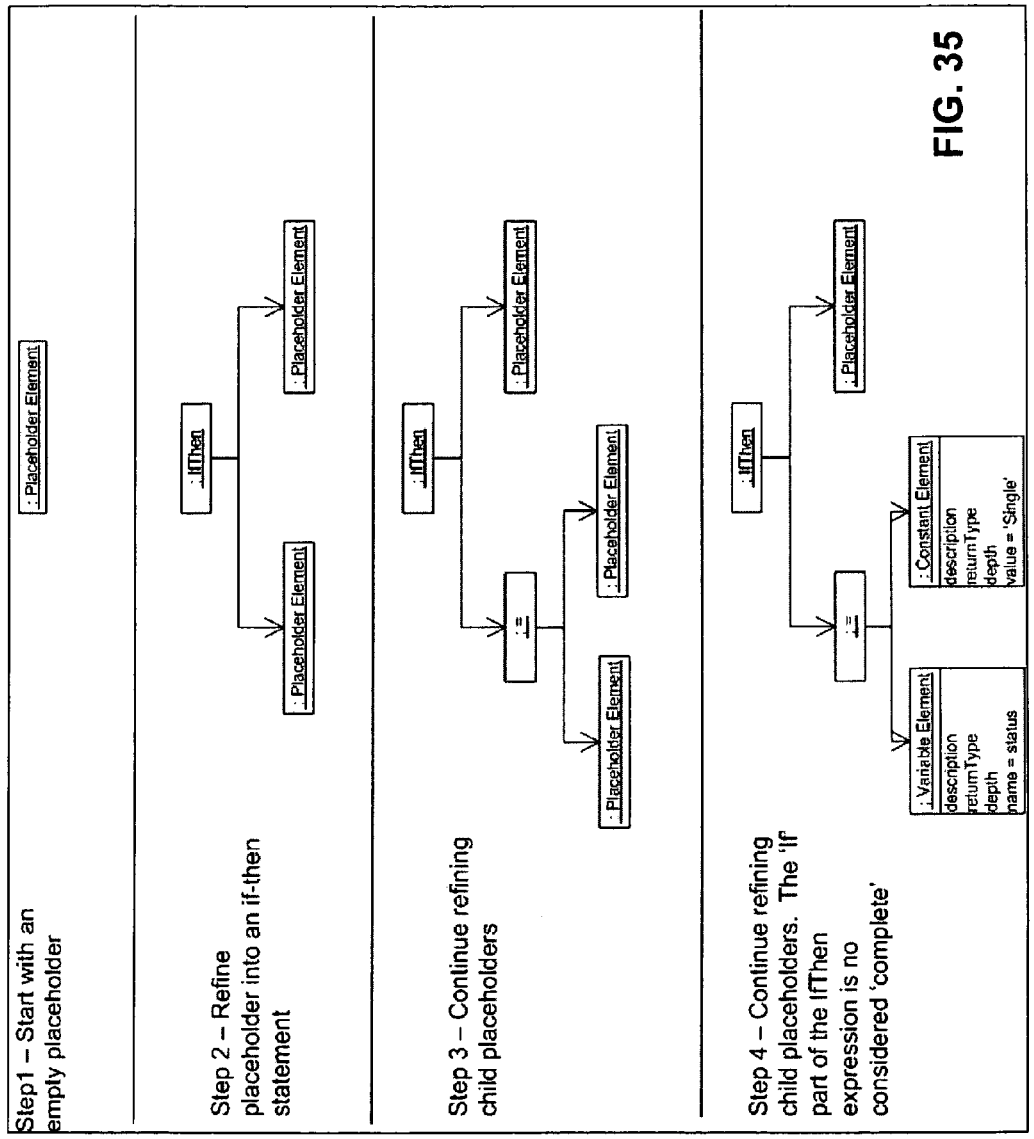
FIG. 35 shows a visual representation of how placeholders are refined to form an expression, as described above with respect to the process in FIG. 34, in accordance with one embodiment of the invention.

FIG. 35 shows a further visual representation of how placeholders are refined to build up an expression, as described above with respect to the process in FIG. 34. As can be seen in FIG. 35, in step 1, there is an empty placeholder element. In step 2, the placeholder element is refined into an if-then statement by adding two empty placeholder children to the first element. In step 3, the expression and child placeholders is further refined. Finally, in step 4, the "if" part of the if-then statement is completed with a variable element and a constant element, whereas the then part still needs to be completed, as is indicated by the empty placeholder element.

It should be noted that in this implementation children are never added or removed to specific expressions, that is, children will never be added to or removed from an if-then expression. The expression will only ever have two children. Thus, refining a placeholder to an if-then expression always results in two additional sub-expressions being added.

Figure 36:
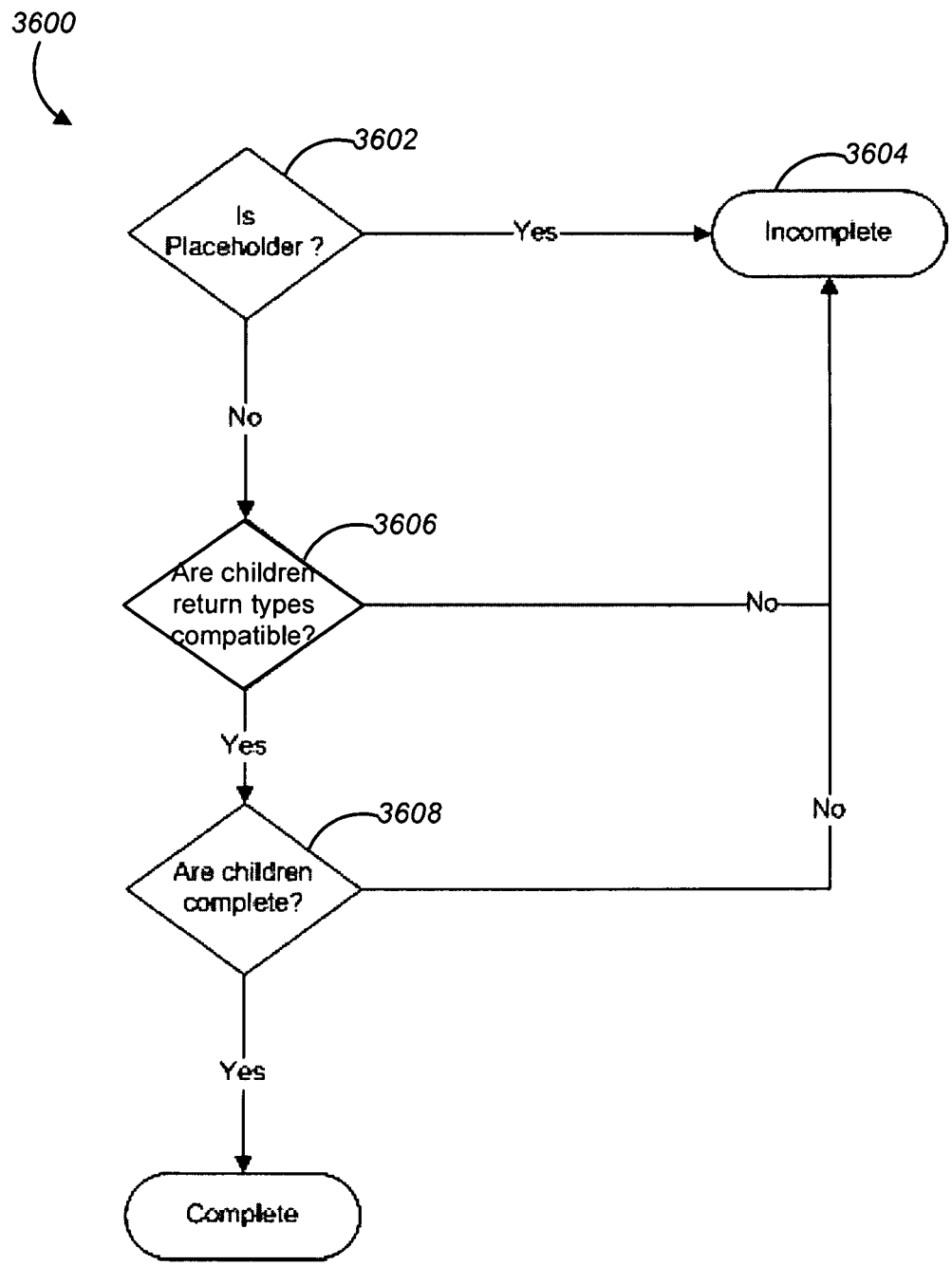
FIG. 36 shows a flowchart of a process for a completeness check, in accordance with one embodiment of the invention.

FIG. 36 shows a flowchart of a process (3600) for a completeness check in accordance with one embodiment of the invention, as described above. As can be seen in FIG. 36, the process (3600) starts by determining whether an element is a placeholder (step 3602). If the element is a placeholder, then the expression is always incomplete (step 3604). If it is determined in step 3602 that the element is not a placeholder, the process continues to determine whether all the children return types are compatible (step 3606). For example, the 'or' operator requires that children return a boolean type. If the children instead return a string, a number, or a date, for example, then the children are said to be incompatible. The expression "'abc' OR '123'," is one example of incompatible children. If the children are incompatible, the expression is always incomplete. Finally, if the children are compatible, the process continues to determine whether the children are complete (step 3608). If the children (if there are any) are incomplete then the expression is incomplete, and otherwise the expression is complete and the process (3600) ends.

Figure 37:
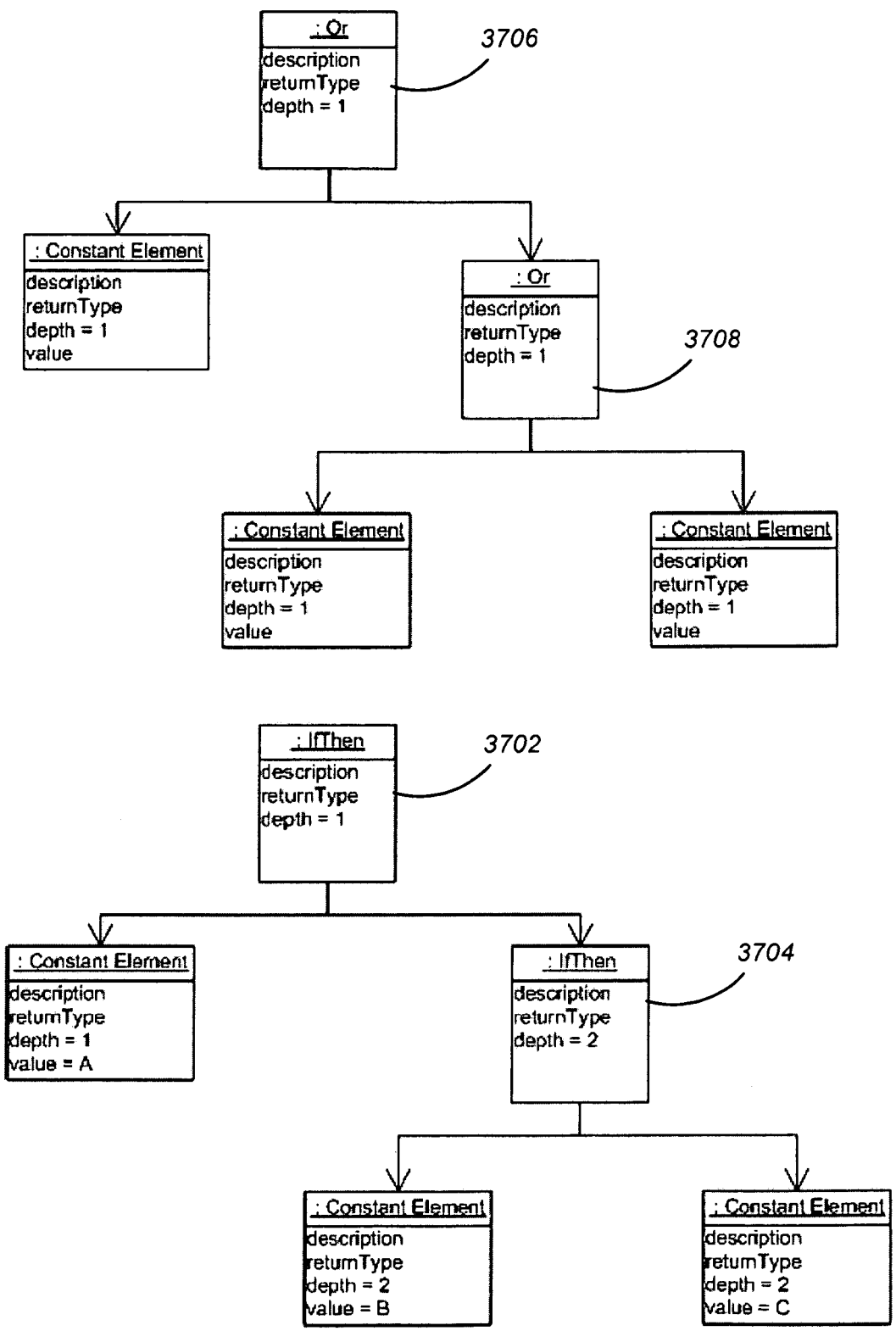
FIG. 37 shows a hierarchical tree for rendering an expression in the user interface, in accordance with one embodiment of the invention.

FIG. 37 shows a hierarchical tree for rendering an expression in the user interface discussed above. As can be seen in FIG. 37, some parent-children child expressions can be rendered at the same level, that is, in the same expression grouping box, whereas others cannot be rendered at the same level. This depends on both the type of expression and the operator precedence. For example, as can be seen in FIG. 37, a parent If-Then expression (3702) with child If-Then operators (3704) will always be rendered at different levels in the user interface. One example of such an expression is "IF (IF A then B) THEN (IF C then D))." On the other hand, a parent OR expression (3706) with child OR expressions (3708) can be rendered at the same level in the user interface. One example of such an expression is "A OR B OR C OR D." This is because some operators can be sequenced together inside of a parenthesis (for example, +, −, /, *, and, or) while others cannot be sequenced together inside of a parenthesis (for example, If-Then, functions). It should be noted that the precedence does factor in here, as a parent OR expression cannot be rendered at the same level as a child AND expression. That is, "A OR (B AND C)." As can also be seen in FIG. 37, constants and variables maintain the same depth as their respective parents, that is, the constants and variables are not really nesting down at all.

The flowcharts and block diagrams in the figures referred to above illustrate the architecture, functionality, and operation of possible implementations of systems, methods and computer program products according to various embodiments of the invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various embodiments of the invention can include a system, method or computer program product. Accordingly, the invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention can take the form of a computer program product embodied in any tangible medium of expression having computer-usable program code embodied in the medium.

Any combination of one or more computer usable or computer readable medium(s) can be used. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, and so on.

Computer program code for carrying out operations of the invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

A number of implementations of the invention have been described. Nevertheless, it will be understood that various modifications may be made without departing from the spirit and scope of the invention. For example, the visual representations can vary compared to what was described above, such as using different shapes or colors. The size and shape of various icons and graphical user interface elements can also vary. The means of user interaction with the graphical editor can also vary, such as using drag-and-drop operations, shortcuts, pop-up menus, and so on, as is familiar to those of ordinary skill in the art. Accordingly, other embodiments are within the scope of the following claims.

The invention claimed is:

1. A computer program product, for providing a visual editor allowing graphical editing of logical expressions in a database expression language, the computer program product comprising:
a non-transitory computer useable medium having computer usable program code embodied therewith, the computer usable program code comprising:
computer usable program code configured to display a graphical user interface;
computer usable program code configured to receive a first user input of a graphical rule logic block on the graphical user interface, wherein the graphical rule logic block represents a high-level definition of a logical expression in plain text for one or more of: a database query, a database rule and a database condition, and wherein the rule logic block includes one or more visual indicators indicating whether the logical expression is usable as is or requires further refinement;

computer usable program code configured to receive a second user input of one or more graphical sub-elements, wherein each individual sub-element is presented as a non-alphanumeric geometric shape and is contained within the rule logic block and represents one of: an operator of a logical expression and an operand of a logical expression, wherein a graphical sub-element representing an operand further includes one or more visual indicators indicating whether the operand is usable as is or requires further refinement;

computer usable program code configured to verify a syntax of the second user input; and computer usable program code configured to provide an alert to the user in response to detecting a syntax error or an inconsistency of the second user input when verifying the syntax.

2. The computer program product of claim 1, wherein the database expression language is one of: a structured query language, a multi dimensional expression language, and a scripting language.

3. The computer program product of claim 1, further comprising:

computer usable program code configured to receive a third user input converting one or more expressions defined in a textual form to expressions defined in a logical form; and wherein verifying a syntax includes verifying the syntax of the second user input after receiving the third user input.

4. The computer program product of claim 1, wherein:

the rule logic block and the one or more sub-elements include rules defining what further sub-elements can be added to the rule logic block or sub-elements, respectively.

5. The computer program product of claim 1, further comprising:

computer usable program code configured to change the layout of the expression on the graphical user interface in response to detecting an increased or decreased complexity of the logical expression.

6. The computer program product of claim 1, further comprising:

computer usable program code configured to display a focus indicator, the focus indicator indicating to the user what graphical element is currently being edited by the user.

7. The computer program product of claim 1, further comprising:

computer usable program code configured to display one or more of the rule logic block and the sub-elements in one of: an expanded state and a collapsed state, wherein the expanded state provides further details about the component represented by the graphical element compared to the collapsed state.

8. The computer program product of claim 1, further comprising:

computer usable program code configured to in response to selecting one of the rule logic block and a sub-element to be edited, display a list of available graphical elements that can be added as sub-elements to the selected element.

9. The computer program product of claim 1, further comprising:

computer usable program code configured to display a validation icon on the graphical user interface, the validation icon being operable to initiate a validation of the expression in response to being selected.

10. The computer program product of claim 1, further comprising:

computer usable program code configured to display a palette on the graphical user interface, the palette containing representations of available graphical elements that can be added as sub-elements to the selected graphical element.

11. A computer-implemented graphical editor allowing graphical editing of logical expressions in a database expression language, comprising:

a processor; and a memory containing instructions executable by the processor to cause the following operations to occur:

displaying a graphical user interface;

receiving a first user input of a graphical rule logic block on the graphical user interface, wherein the graphical rule logic block represents a high-level definition of a logical expression in plain text for one or more of: a database query, a database rule and a database condition, and wherein the rule logic block includes one or more visual indicators indicating whether the logical expression is usable as is or requires further refinement;

receiving a second user input of one or more graphical sub-elements, wherein each individual sub-element is presented as a non-alphanumeric geometric shape and is contained within the rule logic block and represents one of: an operator of a logical expression and an operand of a logical expression, wherein a graphical sub-element representing an operand further includes one or more visual indicators indicating whether the operand is usable as is or requires further refinement;

verifying a syntax of the second user input; and providing an alert to the user in response to detecting a syntax error or an inconsistency of the second user input when verifying the syntax.

12. The graphical editor of claim 11, wherein the memory contains instructions executable by the processor to cause the following additional operations to occur:

receiving a third user input converting one or more expressions defined in a textual form to expressions defined in a logical form; and wherein verifying a syntax includes verifying the syntax of the second user input after receiving the third user input.

13. The graphical editor of claim 11, wherein the memory contains instructions executable by the processor to cause the following additional operation to occur:

displaying a focus indicator, the focus indicator indicating to the user what graphical element is currently being edited by the user.

14. The graphical editor of claim 11, wherein the database expression language is one of: a structured query language, a multi dimensional expression language, and a scripting language.

15. The graphical editor of claim 11, wherein the memory contains instructions executable by the processor to cause the following additional operation to occur:

changing the layout of the expression on the graphical user interface in response to detecting an increased or decreased complexity of the logical expression.

16. The graphical editor of claim 11, wherein the memory contains instructions executable by the processor to cause the following additional operation to occur:

displaying one or more of the rule logic block and the sub-elements in one of: an expanded state and a collapsed state, wherein the expanded state provides further details about the component represented by the graphical element compared to the collapsed state.

17. The graphical editor of claim 11, wherein the memory contains instructions executable by the processor to cause the following additional operation to occur:

displaying a validation icon on the graphical user interface, the validation icon being operable to initiate a validation of the expression in response to being selected.

18. The graphical editor of claim 11, wherein the memory contains instructions executable by the processor to cause the following additional operation to occur:

displaying a palette on the graphical user interface, the palette containing representations of available graphical elements that can be added as sub-elements to the selected graphical element.

\* \* \* \* \*